(12) United States Patent
Moriya et al.

(10) Patent No.: US 8,471,502 B2
(45) Date of Patent: Jun. 25, 2013

(54) VIBRATION DAMPING APPARATUS, ELECTRIC ACTUATOR DRIVING APPARATUS AND VEHICLE

(75) Inventors: Hideaki Moriya, Ise (JP); Takeshi Tomizaki, Ise (JP); Takeo Ito, Ise (JP); Yasushi Muragishi, Ise (JP); Takayoshi Fujii, Ise (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 0 days.

(21) Appl. No.: 13/532,977

(22) Filed: Jun. 26, 2012

(65) Prior Publication Data

US 2012/0293094 A1     Nov. 22, 2012

Related U.S. Application Data

(63) Continuation of application No. PCT/JP2010/072469, filed on Dec. 14, 2010.

(30) Foreign Application Priority Data

Dec. 28, 2009   (JP) ................................. 2009-298657
Mar. 29, 2010   (JP) ................................. 2010-074796

(51) Int. Cl.
  *H02P 25/06*     (2006.01)
  *H02K 41/03*     (2006.01)
(52) U.S. Cl.
  CPC .................................... *H02K 41/03* (2013.01)
  USPC ............ 318/135; 318/685; 318/686; 318/687
(58) Field of Classification Search
  CPC ...................................................... H02K 41/03

USPC .......................................... 318/135, 685–687
See application file for complete search history.

(56) References Cited

U.S. PATENT DOCUMENTS 6,763,694 B1 *   7/2004   Boulton et al. ................. 72/245

FOREIGN PATENT DOCUMENTS

| JP | 2007-272008 A | 10/2007 |
| JP | 2009-275828 A | 11/2009 |
| WO | WO 2007/129627 A1 | 11/2007 |

* cited by examiner

*Primary Examiner* — Walter Benson
*Assistant Examiner* — David Luo
(74) *Attorney, Agent, or Firm* — Oblon, Spivak, McClelland, Maier & Neustadt, L.L.P.

(57) ABSTRACT

A vibration damping apparatus including reference wave production section that produces a reference wave; a fundamental order adaptive algorithm block that calculates fundamental order adaptive filter factors from a vibration detection signal and the reference wave and produces a fundamental order vibration damping current instruction; an amplitude detection section that calculates a peak current value of the fundamental order vibration damping current instruction; and a fundamental order current excess detection section that derives a fundamental order current upper limit value from the fundamental frequency to produce a fundamental order current upper limit excess signal that is output to the fundamental order adaptive algorithm block, which revises the fundamental order adaptive filter factors in a direction in which the vibration damping current instruction is limited within a range.

13 Claims, 11 Drawing Sheets

BEFORE CLAMP PROCESS

EXAMPLE OF CLAMP PROCESS

AFTER CLAMP PROCESS

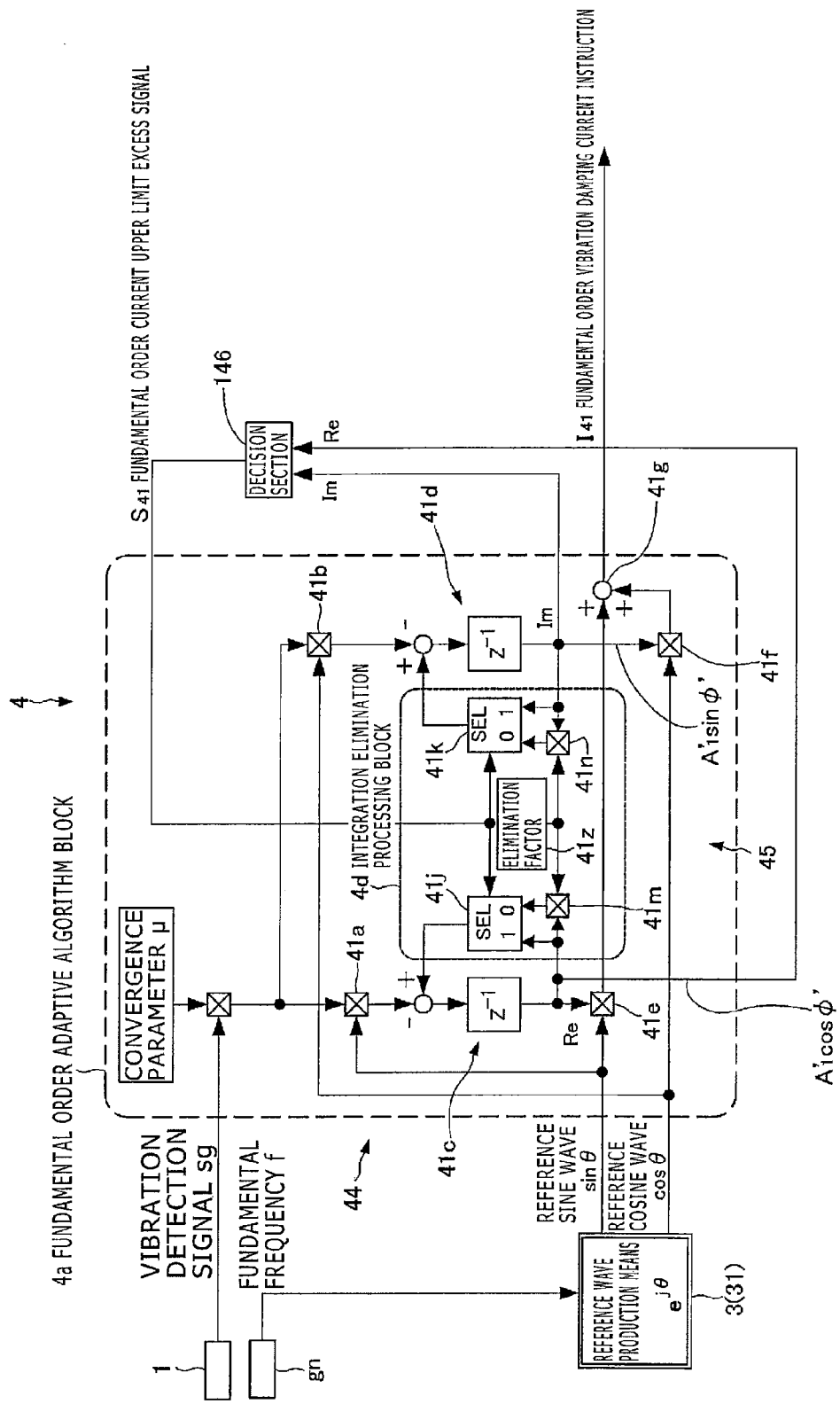

VIBRATION DAMPING APPARATUS, ELECTRIC ACTUATOR DRIVING APPARATUS AND VEHICLE

CROSS-REFERENCE TO RELATED APPLICATIONS

This application is a continuation of International Application No. PCT/JP2010/072469, filed Dec. 14, 2010. This application is based upon and claims the benefit of priority from the prior Patent Application JP 2009-298657 filed Dec. 28, 2009, and JP 2010-074796 filed Mar. 29, 2010. The entire contents of each of these documents are incorporated herein by reference.

TECHNICAL FIELD

The present disclosure relates to a vibration damping apparatus, an electric actuator driving apparatus and a vehicle for which a countermeasure against increase of a driving instruction signal to an excessively high level is suitably applied.

BACKGROUND ART

When an electric actuator beginning with a linear actuator such as a reciprocating motor is electrically driven, there is the possibility that collision of a movable element with a stator, breakage of a controller by flowing of current or application of a voltage which exceeds an acceptable current or voltage through or to the controller or the like may occur. Collision of the movable element with the stator gives rise to generation of noise, generation of abnormal vibration and degradation of the life time, and breakage of the controller gives rise to burnout of the device. Thus, both of the collision and the breakage must be prevented.

As a countermeasure against the collision and the breakage, a technique of limiting (clamping) current or a voltage of a driving instruction signal which is a periodical signal for the instruction of driving of an electric actuator and carrying out a process against the abnormality before a failure occurs is considered as an effective method.

For example, an apparatus shown in FIG. 20 of Patent Document 1 includes an instruction value production section for receiving an engine speed and so forth as inputs thereto to determine and output an amplitude instruction value and a frequency instruction value of vibration to be generated by excitation means which is an electric actuator by arithmetic operation, an amplitude upper limit clamp table in which an upper limit of an applicable current value which is determined from the amplitude instruction value and the frequency instruction value outputted from the instruction value production section, and an application current production section. The application current production section receives the amplitude instruction value and the frequency instruction value as inputs thereto and refers to the amplitude upper limit clamp table to carry out correction for limiting the inputted amplitude instruction value to a value within a suitable (movable) range, and determines and outputs an instruction value of current to be applied to excitation means, for which a reciprocating motor is used, based on the inputted frequency instruction value and the amplitude instruction value after the correction (limitation). Then, by usually driving the movable element of the linear actuator within a suitable movable range, collision with a stopper can be avoided and generation of collision noise can be suppressed.

Further, a motor current instruction is in most cases formed by superposition of several elements, and, in this instance, the sum total value of them is used as a vibration damping current instruction value.

For example, in an apparatus shown in FIG. 10 of Patent Document 1, a line after the engine speed and so forth are inputted until a current instruction value is outputted is provided for each of a primary (fundamental order) vibration mode and a secondary (high order) vibration mode, and the sum total of the current instruction values is inputted as a superposition current instruction to the reciprocating motor.

PRIOR ART DOCUMENT

Patent Document

Patent Document 1: PCT Patent Publication No. WO2007/129627

DISCLOSURE

Technical Problem

However, the vibration damping apparatus which is the conventional electric actuator driving apparatus described above have subjects described below.

First, the vibration damping apparatus has a first subject. In particular, if, in the configuration disclosed in Patent Document 1, correction when an amplitude instruction value inputted referring to the amplitude upper limit clamp table is to be limited to a value within a suitable range is carried out by general clamp control by which excessive current exceeding an upper limit is merely cut (head cutting) immediately, then harmonics are generated in a current instruction upon clamping and abnormal vibration of the excitation means is excited.

Further, where it is tried to apply the current clamp disclosed in Patent Document 1 to a configuration of Patent Document 2, it is not clear with what distribution the current instructions from the fundamental order and the high order are to be limited.

Further, in conventional vibration damping apparatus beginning with those of the Patent Documents described above, protection where enormous external force is applied to the linear actuator or where voltage saturation occurs in a high-frequency region is not considered and there is the possibility that control may result in failure.

The vibration damping apparatus has a second subject independently of the first subject. In particular, in the configuration disclosed in Patent Document 1, an amplitude instruction value to be corrected (limited) is a vector having amplitude information and phase information corresponding to an amplitude and a phase of current to be applied to the excitation means, and the vector is represented by two vectors orthogonal to each other and the magnitudes of the vectors are represented by coefficients which include a real number part and a imaginary number part so that they are determined as elements suitable for calculation (refer to FIG. 10 of Patent Document 1).

However, while clamp control of cutting that one of the real number part or the imaginary number part which exceeds an upper limit is carried out in the particular configuration described above in which the amplitude instruction value is limited by referring to the amplitude upper limit clamp table, if only one of the real number part or the imaginary number part is clamped, then the direction of the vector represented by the real number part and the imaginary number part after the correction varies to cause phase displacement of the driving instruction signal thereby to degrade the driving accuracy.

Particularly, where the conventional apparatus is applied to a vibration damping system wherein an electric actuator is used as excitation means, there is a severe request that, when vibration having a phase opposite to that of vibration to be damped is excited, the phase of vibration to be excited must fully coincide with an object phase. Phase displacement of the driving instruction signal has a significant bad influence on the vibration damping accuracy.

It is an object of the first aspect of the disclosure to provide a vibration damping apparatus which effectively solves the first subject and a vehicle in which the vibration damping apparatus is incorporated.

It is an object of the second aspect of the disclosure to provide an electric actuator driving apparatus which effectively solves the second subject and a vibration damping apparatus in which the electric actuator driving apparatus is provided.

Technical Solution

The first aspect of the disclosure takes the following countermeasures in order to attain the object described above.

In particular, according to the first aspect of the present disclosure, there is provided a vibration damping apparatus including reference wave production means for producing a reference wave from a fundamental frequency, fundamental order adaptive controlling means for calculating fundamental order adaptive filter factors from a vibration detection signal detected from a position at which vibration damping is to be carried out and the reference wave and producing a fundamental order vibration damping current instruction based on the fundamental order adaptive filter factors to cause vibration having an opposite phase to that of vibration from a vibration generation source at the position at which vibration damping is to be carried out to be generated through excitation means, amplitude detection means for calculating a peak current value of the fundamental order vibration damping current instruction, and fundamental order current excess detection means for deriving a fundamental order current upper limit value determined in advance from the fundamental frequency to produce, where a peak current value of the fundamental order vibration damping current instruction exceeds the fundamental order current upper limit value, a fundamental order current upper limit excess signal and inputting the produced signal to the fundamental order adaptive controlling means, characterized in that the fundamental order adaptive controlling means revises, within a period within which the fundamental order current upper limit excess signal is inputted thereto, the fundamental order adaptive filter factors in a direction in which the vibration damping current instruction is limited within a range determined in advance.

The point of the term of range determined in advance is to suppress a significant variation of the vibration damping current instruction.

If such a configuration as described above is applied, then where the vibration damping current instruction exceeds, not the exceeding part of the vibration damping current instruction is cut immediately but revision for limiting the vibration damping current instruction within the range determined in advance is repetitively carried out. Therefore, collision of the movable element with the stator, breakage of the controller or the like can be effectively prevented while avoiding generation of harmonics.

The control for the fundamental order in this case is not necessarily intended for control for high orders.

However, where a countermeasure against high orders is required at the same time, in order to carry out limitation of current for high orders while maintaining effective conjunction with limitation of current for the fundamental order, preferably the vibration damping apparatus further includes high order reference wave production means for producing a high order reference wave from the fundamental frequency, high order adaptive controlling means for calculating high order adaptive filter factors from a vibration detection signal obtained from the vibration detection means and the high order reference wave to produce a high order vibration damping current instruction based on the high order adaptive filter factors to generate vibration having an opposite phase to that of the vibration from the vibration generation source together with the fundamental order vibration damping current instruction at the position at which vibration damping is to be carried out through the excitation means, amplitude detection means for calculating a high order peak current value of the high order vibration damping current instruction and high order current excess detection means for deriving a high order current upper limit value determined in advance from the fundamental frequency to produce, where a peak current value of the high order vibration damping current instruction exceeds a value obtained by subtracting the fundamental order peak current value from the high order current upper limit value, a high order current upper limit excess signal and inputting the produced signal to the high order adaptive controlling means, wherein the high order adaptive controlling means revises, within a period within which the high order current upper limit excess signal is inputted thereto, the high order adaptive filter factors in a direction in which the high order vibration damping current instruction is limited within a range determined in advance every time the high order adaptive filter factors are calculated.

Further, where the vibration damping apparatus includes a current correction section adapted to further apply correction to the vibration damping current instruction produced by the adaptive controlling means, it is effective for the vibration damping apparatus to further include post-correction current excess detection means for producing, where the current instruction value after the correction exceeds a current upper limit value set in advance, a post-correction current excess signal and input the produced signal to the adaptive controlling means, such that the adaptive controlling means revises, also where the post-correction current excess signal is inputted thereto, the adaptive filter factor in a direction in which the vibration damping current instruction is limited within a range determined in advance every time the adaptive filter factors are calculated.

Further, in order to effectively prevent a failure of the control arising from an abnormal voltage in the configurations described above, it is effective to configure the vibration damping apparatus such that it further includes voltage instruction upper limit detection means for detecting a voltage instruction value appearing on an input line of a vibration damping current instruction to the excitation means and inputting, where the voltage instruction value exceeds an upper limit threshold value of a voltage instruction set in advance and allowed to the excitation means, a voltage instruction upper limit detection signal to the adaptive controlling means, wherein the adaptive controlling means revises, also where the voltage instruction upper limit detection signal is inputted thereto, the adaptive filter factors in a direction in which the vibration damping current instruction is narrowed within a range determined in advance every time the adaptive filter factors are calculated.

In order to apply an effective clamp characteristic, preferably the adaptive controlling section is configured such that it repetitively carries out a process for updating the adaptive filter factors while integrating the input signal inputted thereto from the vibration detection section and carries out a process for narrowing the integration values to low values when the vibration damping current instruction is limited.

The vibration damping apparatus of the present disclosure can be applied particularly suitably for damping vibration generated from an engine where it is incorporated in a vehicle.

The second aspect of the disclosure takes the following countermeasures in order to attain the object described above.

In particular, according to the second aspect of the present disclosure, there is provided an electric actuator driving apparatus which produces, when a driving instruction signal which is a periodical signal is to be produced and inputted to an electric actuator to drive the electric actuator, the driving instruction signal based on an instruction vector having amplitude information and phase information corresponding to an amplitude and a phase of the driving instruction signal, including factor calculation means for calculating a plurality of factors individually indicating sizes of a plurality of vectors which represent the instruction vector and cross with each other, instruction signal production means for producing the driving instruction signal based on the factors calculated by the factor calculation means, and narrowing instruction means for producing, where a predetermined condition is satisfied, a narrowing instruction signal and inputting the produced signal to the factor calculation means, characterized in that the factor calculation means revises, within a period within which the narrowing instruction signal is inputted thereto, all of the factors in a direction in which the driving instruction signal is limited and a ratio of revision for the factors is equal among all factors.

With the configuration described above, when the narrowing instruction signal is inputted, all factors for representing an instruction vector are revised in a direction in which the driving instruction signal is limited and the ratio of revision for the factors is same among all factors. Therefore, the magnitude of the instruction vector is revised in a direction in which the driving instruction signal is limited while the direction of the instruction vector does not vary. Consequently, collision of the movable element with the stator, break of the controller or the like can be effectively prevented while avoiding that the phase of the periodic driving instruction signal produced based on the factors is displaced. Therefore, not only the reliability and the durability of the electric actuator but also the driving accuracy can be enhanced effectively.

Where the electric actuator driving apparatus further includes driving instruction correction means for further applying correction to the driving instruction signal produced by the instruction signal production means, it is effective for the narrowing instruction means to decide, where an amplitude value of the driving instruction signal after the correction exceeds an upper limit value set in advance, that the predetermined condition is satisfied.

In order to improve the responsiveness, preferably the narrowing instruction means decides, where the magnitude of the instruction vector represented by the factors exceeds an upper limit value, that the predetermined condition is satisfied.

In order to further pursue the driving accuracy of the electric actuator, the factor calculation means repetitively carries out the calculation of the factors while keeping the revision of the factors for one time revision within a range determined in advance so that the revision of the factors is carried out stepwise.

The point of the term of range determined in advance is to suppress a significant variation of the driving instruction signal.

The electric actuator driving apparatus of the present disclosure can be applied particularly suitably to a vibration damping apparatus which generates vibration having a phase opposite to that of vibration to be damped through excitation means in the form of an electric actuator to control vibration.

Advantageous Effect

In the first aspect of the disclosure, an excess of the current instruction is detected and fed back to the adaptive filter factors so that the current instruction is gradually decreased toward a proper value as described above. Therefore, an excellent effect can be achieved that it is possible to effectively prevent collision of the movable element with the stator, breakage of the controller or the like while avoiding generation of harmonics thereby to effectively enhance the reliability and durability as a vibration damping apparatus.

In the second aspect of the disclosure, all factors for representing the instruction vector are revised in a direction in which the driving instruction signal is limited and the ratio of revision for the factors is same regarding all factors as described above. Therefore, the magnitude of the instruction vector is revised in a direction in which the driving instruction signal is limited while the direction of the instruction vector does not change when the driving instruction signal is limited. Consequently, it is possible to avoid the phase of the driving instruction signal from being displaced from a desired phase thereby to effectively enhance the driving accuracy.

Accordingly, with the first and second aspects of the disclosure, the electric actuator driving apparatus and the vibration damping apparatus which suitably cope with a situation that the driving instruction signal such as a current instruction becomes excessively high can be provided.

BRIEF DESCRIPTION OF DRAWINGS

FIG. 11 is a block diagram showing a configuration relating to vibration damping control for fundamental order in an embodiment other than the embodiment described above.

DETAILED DESCRIPTION

In the following, a vibration damping apparatus and an electronic actuator driving apparatus of the present embodiment which are applied to a vehicle are described with reference to FIGS. 1 to 10. The present embodiment corresponds to the first aspect of the disclosure and the second aspect of the disclosure.

Figure 1:
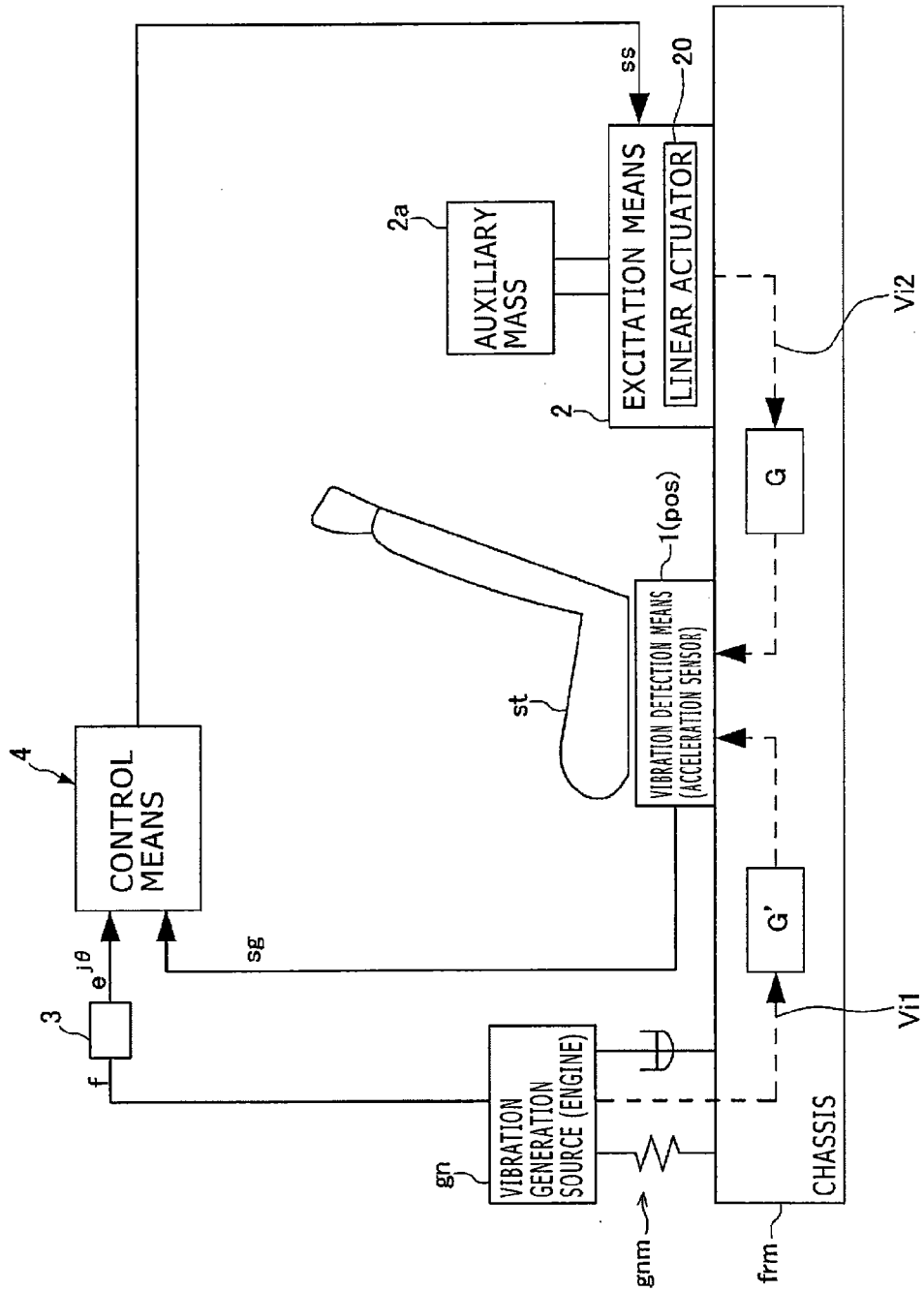
FIG. 1 is a schematic configuration diagram of a vibration damping apparatus of a first embodiment applied to a vehicle.

When the electric actuator driving apparatus of the present embodiment produces a driving instruction which is a periodic signal and inputs the driving instruction to drive an electric actuator, it produces a driving instruction signal based on an instruction vector having amplitude information and phase information corresponding to an amplitude and a phase of the driving instruction signal and is incorporated in the vibration damping apparatus. The vibration damping apparatus of the present embodiment is incorporated in a vehicle such as an automobile as shown in FIG. 1, and has vibration detection means 1 such as an acceleration sensor and so forth provided at a position pos at which vibration damping should be carried out such as a seat st, excitation means 2 for causing an auxiliary mass 2a having a predetermined mass to vibrate to generate canceling vibration vi2 using a linear actuator 20, reference wave production means 3 for producing a reference wave $e^{j\theta}$ from a fundamental frequency f extracted from an ignition pulse of an engine which is a vibration generation source gn, and adaptive controlling means 4 for receiving a vibration detection signal sg from the vibration detection means 1 and the reference wave $e^{j\theta}$ as inputs thereto to cause the excitation means 2 to generate the canceling vibration vi2. The vibration damping apparatus causes vibration vi1 generated by the vibration generation source gn such as an engine mounted on a chassis form through a mounter gnm and canceling vibration vi2 generated by the excitation means 2 to cancel each other at the position pos to reduce vibrations at the position pos at which vibration should be damped.

The vibration detection means 1 detects principal vibration in the same direction as the principal vibration direction of the engine using an acceleration sensor and so forth and outputs a vibration detection signal sg $\{=A_1 \sin(\theta+\phi)\}$.

Figure 2:
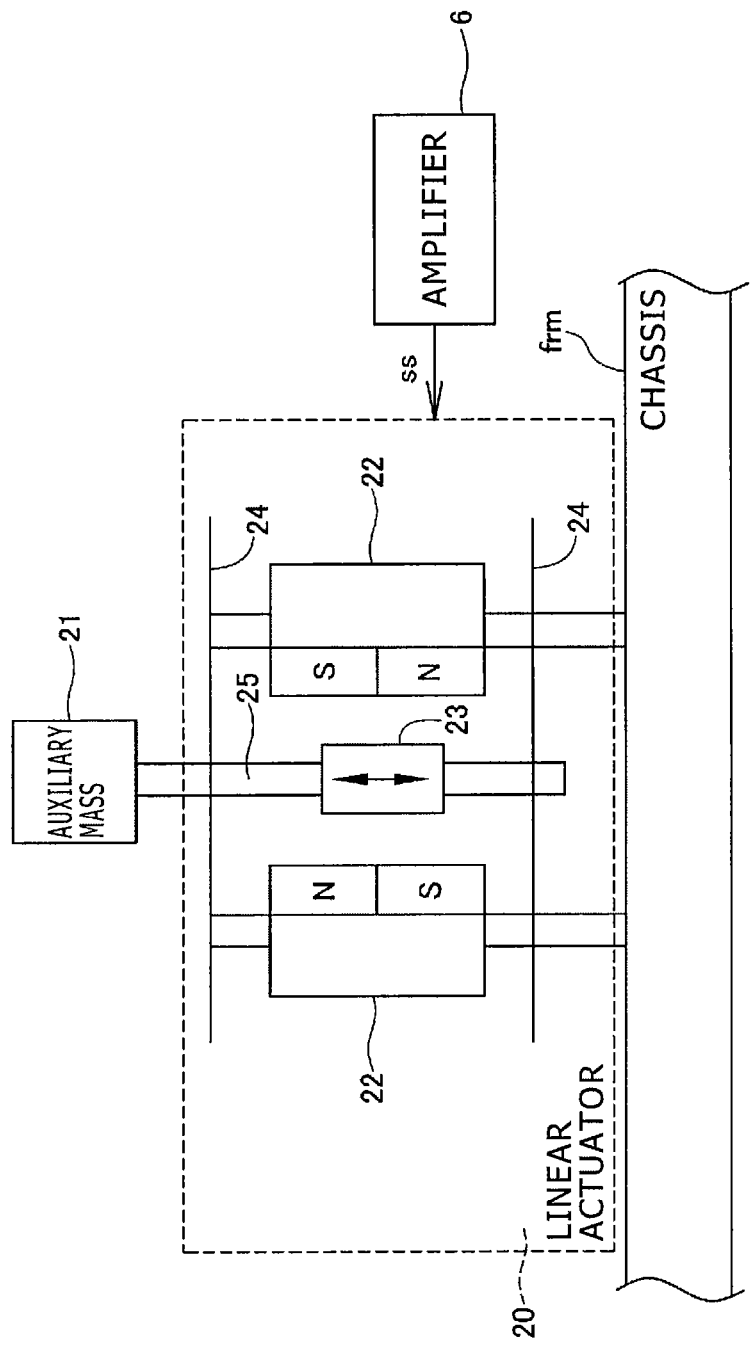
FIG. 2 is a schematic block diagram of excitation means including a linear actuator which configures the vibration damping apparatus.

The linear actuator 20 is of the reciprocation type wherein a stator 22 including a permanent magnet is secured to the chassis form and reciprocating movement (upward and downward movement in the plane of FIG. 2) in the same direction as the direction of vibration to be suppressed is carried out by a movable element 23 as shown in FIG. 2. Here, the linear actuator 20 is secured to the chassis form such that the direction of vibration of the chassis form to be suppressed and the reciprocating direction (thrust direction) of the movable element 23 coincide with each other. The movable element 23 is attached to a stem 25 together with an auxiliary mass 21, and this stem 25 is supported on the stator 22 through a leaf spring 24 which can move in the thrust direction on the movable element 23 and the auxiliary mass 21. A dynamic damper is configured from the linear actuator 20 and the auxiliary mass 21.

If AC current (sine wave current or rectangular wave current) is supplied to a coil (not shown) which configures the linear actuator 20, then in a state in which current flows in a predetermined direction through the coil, magnetic fluxes are guided from the S pole to the N pole of the permanent magnet to form a magnetic flux loop. As a result, the movable element 23 moves in the direction opposite to the gravity (upward direction). On the other hand, if current is supplied in the reverse direction to the predetermined direction to the coil, then the movable element 23 moves in the direction of the gravity (downward direction). Since the flowing direction of the current through the coil by the AC current varies alternately, the movable element 23 repeats the operations described above and moves back and forth in an axial direction of the stem 25 with respect to the stator 22. Consequently, the auxiliary mass 21 joined to the stem 25 vibrates in the upward and downward directions. Since a more particular structure and operation of the linear actuator 20 itself are publicly known as disclosed also in Patent Document 1 and so forth, detailed description of them is omitted herein. The movable element 23 has a range of movement restricted by stoppers not shown. The dynamic damper configured from the linear actuator 20 and the auxiliary mass 21 can cancel vibration generated on the chassis form to reduce the vibration by controlling the acceleration of the auxiliary mass 21 based on a current controlling signal ss outputted from an amplifier 6 to adjust the vibration damping force.

The reference wave production means 3 (31) of the fundamental order generates a reference sine wave ($\sin \theta$) and a reference cosine wave ($\cos \theta$) which serves as the reference wave $e^{j\theta}$ of the fundamental order from the fundamental frequency f [Hz]. The reference sine wave ($\sin \theta$) and the reference cosine wave ($\cos \theta$) to be produced may be or may not be synchronized with some synchronizing signal. $\theta=\omega t=2\pi ft$.

Figure 9A:
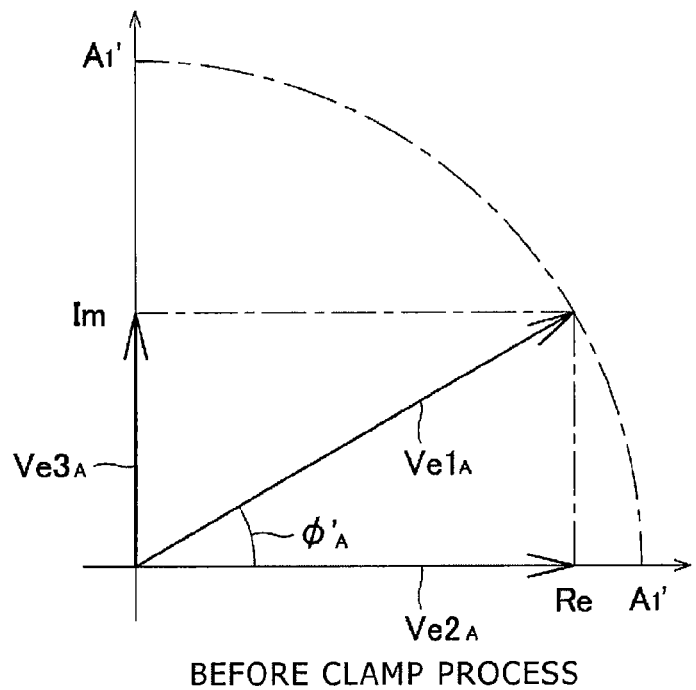
FIG. 9 are an explanatory view illustrating adaptive filter factors and a vector represented by the factors.

The adaptive controlling means 4 includes, as a principal component thereof, a fundamental adaptive algorithm block 4a serving as fundamental order adaptive controlling means for controlling vibration of the fundamental order. The fundamental adaptive algorithm block 4a has factor factor calculation means 44 and instruction signal production means 45. In the fundamental adaptive algorithm block 4a, fundamental order adaptive filter factors (Re, Im)=($A_1'\cos\phi'$, $A_1'\sin\phi'$) are calculated from the vibration detection signal sg and the reference wave $e^{j\theta}\{=(\sin\theta, \cos\theta)\}$ by the factor calculation means 44, and a fundamental order vibration damping current instruction $I_{41}$ which is a driving instruction signal is produced based on the fundamental order adaptive filter factors (Re, Im) by the instruction signal production means 45. Based on this, the current controlling signal ss is inputted to the linear actuator 20 through a current PI arithmetic operation block 5 and the amplifier 6 hereinafter described so that vibration of a phase opposite to that of vibration from the vibration generation source gn at the position pos at which vibration damping is to be carried out is generated through the excitation means 2. First, a reverse signal (signal of the opposite sign) of a sine wave of a fundamental frequency of the vibration detection signal sg $\{=A_1\sin(\theta+\phi)\}$ detected is produced. The vibration detection signal $A_1\sin(\theta+\phi)$ is multiplied by a convergence parameter μ first and then is multiplied by a reference sine wave $\sin\theta$ and a reference cosine wave $\cos\theta$ by multipliers 41a and 41b, respectively. Thereafter, the products are integrated by being added to preceding values $Z^{-1}$ for each arithmetic operation by integrators 41c and 41d. Results of the arithmetic operation are calculated as a vector $Vel_A$ of an opposite phase sine wave, that is, adaptive filter factors (Re, Im)=($A_1'\cos\phi'$, $A_1'\sin\phi'$), having a component of the convergence direction of an opposite phase sine wave vector displaced from the reference sine wave ($\sin\theta$) of the vibration detection signal sg by the factor calculation means 44 (refer to FIG. 9(a)). The vector $Vel_A$ of the opposite sine wave is represented by a plurality of vectors $Ve2_A$ and $Ve3_A$ orthogonal to each other as seen in FIG. 9(a), and the fundamental order adaptive filter factor Re represents the magnitude of the vector $Ve2_A$ and the fundamental order adaptive filter factor Im represents the magnitude of the vector $Ve3_A$. Further, the magnitude of the vector $Ve1_A$ corresponds to the amplitude, and the direction (angle $\phi'_A$) of the vector $Ve1_A$ corresponds to the phase. The calculated adaptive filter factors (Re, Im) are multiplied by the reference sine wave sin θ and the reference cosine wave (cos θ) by multipliers 41e and 41f, respectively, and results of the multiplication are added by an adder 41g to produce a fundamental order vibration damping current instruction $I_{41}$ {=$A_1'$ sin(θ+φ)} as an opposite phase sine wave signal to the vibration detection signal sg. If the integration is repeated, then cancellation of vibration advances as A' and φ' converge to values corresponding to true values A and φ, respectively. However, since the fundamental frequency for the phase θ constantly varies, the control is carried out in such a form as to always follow up the variation.

If, during such control as described above, the movable element 23 which configures the linear actuator 20 collides with a stopper or the like not shown provided on the stator 22 due to overcurrent, then since this makes a cause of generation of noise or degradation of the life cycle, it is necessary to suppress the vibration damping current instruction $I_{41}$.

Therefore, in the present embodiment, amplitude detection means 4b for calculating a peak current value $A_1'$ of the fundamental order vibration damping current instruction $I_{41}$ and fundamental order current excess detection means 4c for deriving a fundamental order current upper limit value $\alpha_1$ determined in advance from the fundamental frequency f and producing, when the peak current value $A_1'$ of the fundamental order vibration damping current instruction $I_{41}$ exceeds the fundamental order current upper limit value $\alpha_1$ described above, a fundamental order current upper limit excess signal $S_{41}$ are provided.

The amplitude detection means 4b is a block for calculating the amplitude $A_1'$ of the fundamental order vibration damping current instruction $I_{41}$ at any time (on the real time basis). The amplitude detection means 4b may determine the value $A_1'$ of the fundamental order vibration damping current instruction $I_{41}$ from the waveform $A_1'$ sin(θ+φ') of the produced fundamental order vibration damping current instruction $I_{41}$ or by calculating a root-sum-square value of the addition data before the waveform production. Or, in order to moderate the arithmetic operation amount, only the sum of squares may be calculated while the current upper limit value $\alpha_1$ to be compared is squared.

Figure 4A:
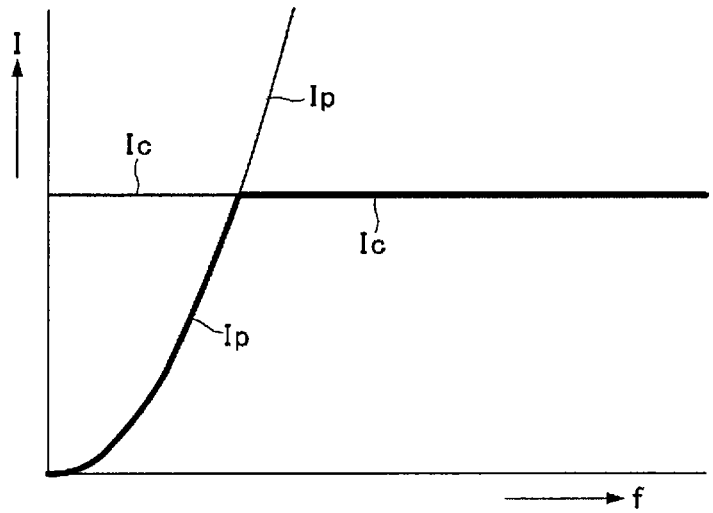
FIG. 4 are a view illustrating an upper limit value set in a current clamp table and a general idea of deriving the upper limit value in the embodiment.

The fundamental order current excess detection means 4c stores the fundamental order current upper limit value $\alpha_1$ in the form of a current clamp table 41h. As this upper limit value $\alpha_1$, one of smaller values of motor upper limit current Ic (maximum output value) or position upper limit current Ip (collision prevention) illustrated in FIG. 4(a) is adopted.

The motor upper limit current Ic is a lower one of a maximum current value which can be outputted from a controller which realizes the arithmetic operation processing function of the present embodiment or a maximum current value (of such a degree that the magnet is not demagnetized) which can be supplied to the linear actuator 20, and is fixed irrespective of the frequency.

Figure 4B:
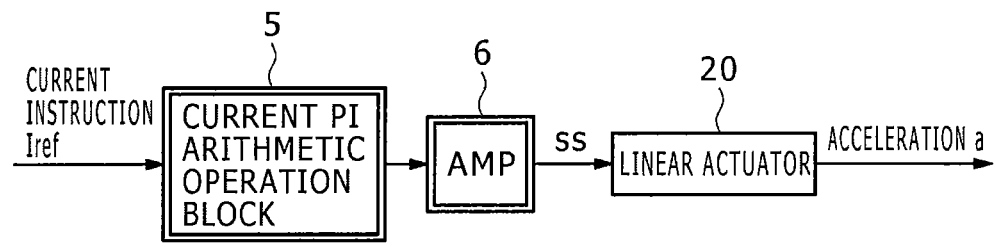
Figure 4C:
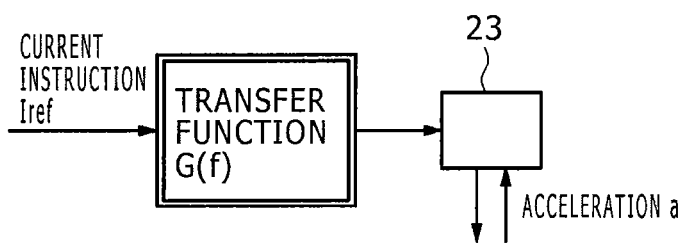

Meanwhile, the position upper limit current Ip is an upper limit value to the current which does not exceed an amplitude upper limit at which the movable element 23 which operates when sine wave current is supplied thereto can move, and where a sine wave acceleration is represented by a and a maximum acceleration is represented by Ap (=a√2), an allowable amplitude Lp of the current instruction Iref illustrated in FIG. 4(b) is Lp<|Xmax|=Ap/ω². This current instruction Iref is arithmetically operated by the current PI arithmetic operation block 5 and inputted as a voltage instruction to the amplifier 6 so that the linear actuator 20 is driven with the acceleration a by driving by the amplifier 6. If the transmission gain from the current instruction Iref until the acceleration a is generated by the movable element 23 is represented by G(f) as seen in FIG. 4(c), then a relationship of a(f)=Iref·G(f) . . . (1) is satisfied. Now, if it is assumed that a maximum acceleration Ap(f) is obtained when maximum current Ip(f) is applied, then since Ap(f)=G(f)·Ip(f) . . . (2), Ip(f)=ω²|Xmax|/G(f) is obtained from the expressions (1) and (2), and this Ip(f) is the position upper limit current. By inputting the fundamental frequency f extracted from the engine gn, current position upper limit current Ip(f) is determined.

The fundamental order current upper limit value $\alpha_1$ (lower one of Ic or Ip) and the fundamental order peak current value $A_1'$ are inputted to a comparison section 41i, by which it is discriminated whether or not the fundamental order peak current value $A_1'$ is equal to or higher than the fundamental order current upper limit value (current clamp value) $\alpha_1$ at the frequency. If the fundamental order peak current value $A_1'$ exceeds, then a current upper limit excess signal $S_{41}$ (ON signal) is outputted. If the fundamental order peak current value $A_1'$ does not exceed, then no current upper limit excess signal $S_{41}$ is outputted (OFF signal). This signal $S_{41}$ may be switched ON/OFF depending purely upon whether or not the fundamental order peak current value $A_1'$ exceeds or may have some hysteresis characteristic.

Figure 9B:
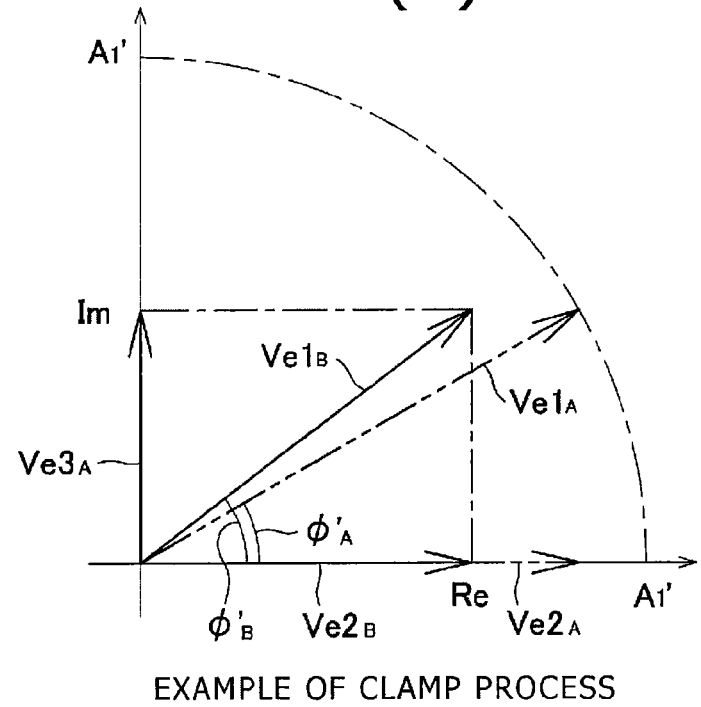
Figure 10:
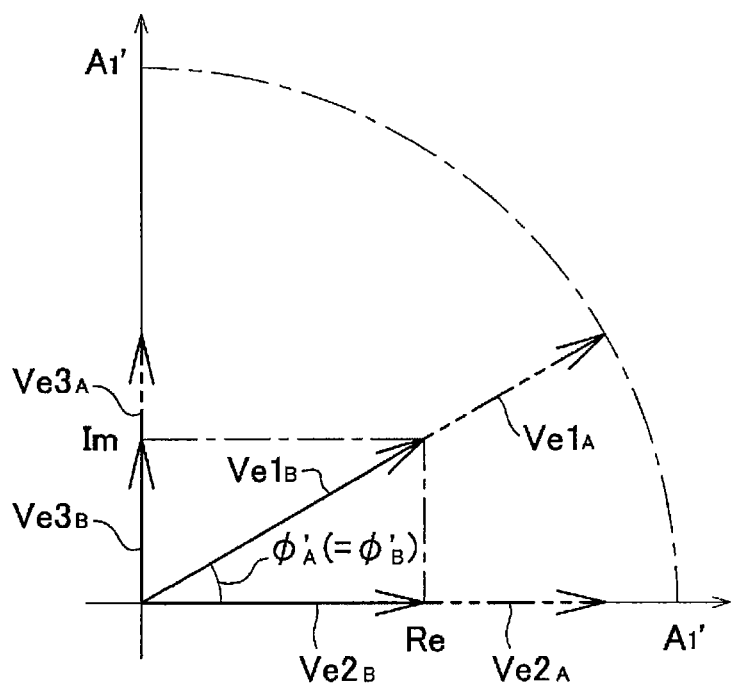
FIG. 10 is an explanatory view illustrating adaptive filter factors and a vector represented by the factors.

While the fundamental order current upper limit excess signal $S_{41}$ is produced in such a manner as described above, if the current is clamped by merely cutting (head cutting) the vibration damping current instruction $I_{41}$ by means of a filter or the like when the signal $S_{41}$ is outputted, then harmonics are generated, causing an above-described failure such as abnormal driving of the electric actuator. Or, when the vibration damping current instruction $I_{41}$ is to be limited, if a clamp process of cutting a value exceeding an upper limit is carried out independently for each of the filter factors Re and Im, then when only one of the filter factors Re and Im is clamped as seen in FIG. 9(b) (the figure illustrates an example wherein only the filter factor Re is clamped), the direction of a vector $Ve1_B$ of the opposite phase sine wave represented by the filter factors Re and Im after the clamp is different from the direction of the vector $Ve1_A$ (angle $\phi'_A$→angle $\phi'_B$). Since the direction of a vector represents a phase, phase displacement of the current instruction $I_{41}$ is caused.

Figure 3:
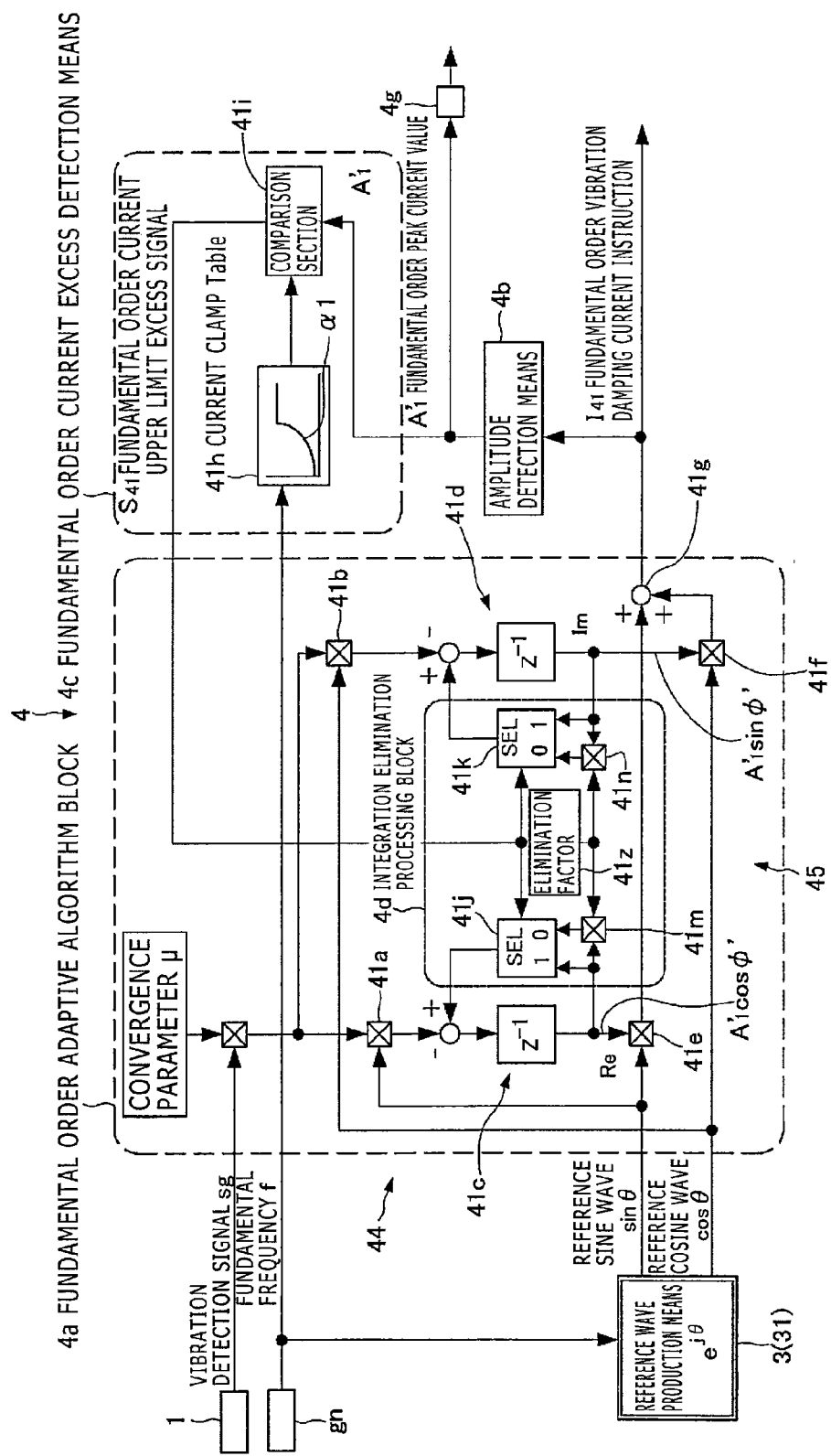
FIG. 3 is a block diagram showing a configuration relating to vibration damping control for a fundamental order in the embodiment.

Therefore, in the present embodiment, as seen in FIG. 3, the fundamental order current upper limit excess signal $S_{41}$ is inputted to the fundamental adaptive algorithm block 4a, and while the fundamental order current upper limit excess signal $S_{41}$ is inputted to the fundamental adaptive algorithm block 4a, every time the fundamental order adaptive filter factors (Re, Im) are calculated, the fundamental order adaptive filter factors (Re, Im) are revised in a direction in which the vibration damping current instruction $I_{41}$ is limited within a range determined in advance.

While the fundamental adaptive algorithm block 4a repeats the process of integrating the input signal sg inputted thereto from the vibration detection means 1 to update the adaptive filter factors (Re, Im) as described above, an integration elimination processing block 4d is provided at a position at which, when the vibration damping current instruction $I_{41}$ is limited, the integration value is narrowed down to a low value and carries out an integration elimination process. In particular, a flag of 0 or 1 is set to internal flag setting sections 41j and

41k depending upon whether or not the current upper limit excess signal $S_{41}$ is inputted. When the signal $S_{41}$ is not inputted (when the flag is 1), the narrowing is not carried out, but when the signal $S_{41}$ is inputted (when the flag is 0), multipliers 41m and 41n multiply a preceding value $Z^{-1}$ by an elimination factor value k which is a subtraction factor value set by an elimination factor setting section 41z which is a subtraction factor setting section for each arithmetic operation timing to narrow the integration value to a low value. The elimination factor value k is for making the amount by which narrowing is to be carried out by single time arithmetic operation small and is set, for example, to k=1020/1024 (=0.9961) or the like. The reason why the elimination factor value k is set to a value which is not much lower than 1 (the reason why the narrowing amount is suppressed to a low value) is that, if the elimination factor value k is excessively great, then the value of the fundamental order current instruction $I_{41}$ varies suddenly by a single time narrowing operation and harmonics are superposed on the output to make a cause of excitation of abnormal vibration. In this manner, the elimination factor value k is commonly used by all adaptive filter factors (Re and Im). Thus, by multiplying all coefficients (Re, Im) by the elimination factor value k, the ratios of modification to the coefficients (Re, Im) are all equal to each other, and the direction of the vector $Ve1_B$ represented by vectors $Ve2_B$ and $Ve3_B$ after the modification coincides with and is not different from the direction of the vector $Ve1_A$ ($\phi'_A=\phi'_B$) before the modification, and only the magnitude of the vector $Ve1_B$ is limited. The value of the elimination factor value k may be varied in response to a deviation signal from the comparison section 41i by the elimination factor setting section 41z such that it decreases (in other words, the narrowing amount increases) as the excess amount from the fundamental order current upper limit value $\alpha_1$ (current clamp value) increases. Or, the rate of the excess amount may be calculated to establish synchronism with the current upper limit value $\alpha_1$. It is to be noted that, while, in the present embodiment, the instruction vector is represented using two adaptive filter factors (Re and Im), the limiting method described above can be applied similarly also where three or more coefficients are used to represent an instruction vector.

In particular, when the vibration damping current instruction $I_{41}$ exceeds, not the excess amount of the vibration damping current instruction $I_{41}$ is cut immediately, but modification of limiting the vibration damping current instruction $I_{41}$ within a range determined in advance (here, within a range of the narrowing of integration with the elimination factor value k) is repeated. Therefore, the vibration damping current instruction $I_{41}$ gradually approaches an amplitude with which no harmonics are generated and no collision of the movable element occurs. The narrowing factor production block 4d is an example at all, and only if a block carries out turning on or off of application of the narrowing factor k or increasing or decreasing the narrowing factor k from the current upper limit excess signal $S_{41}$, then it may have any internal configuration. The convergence of the adaptive filter factors (Re and Im) is accelerated as the value of the convergence parameter $\mu$ increases.

Further, since vibration generated by the vibration generation source gn shown in FIG. 1 includes harmonic orders superposed on the fundamental order, even if excess current flows in the high orders, the movable element 23 which configures the linear actuator 20 suffers from collision with the stator 22 or the like, which makes a cause of generation of noise or degradation of the life cycle.

Figure 5:
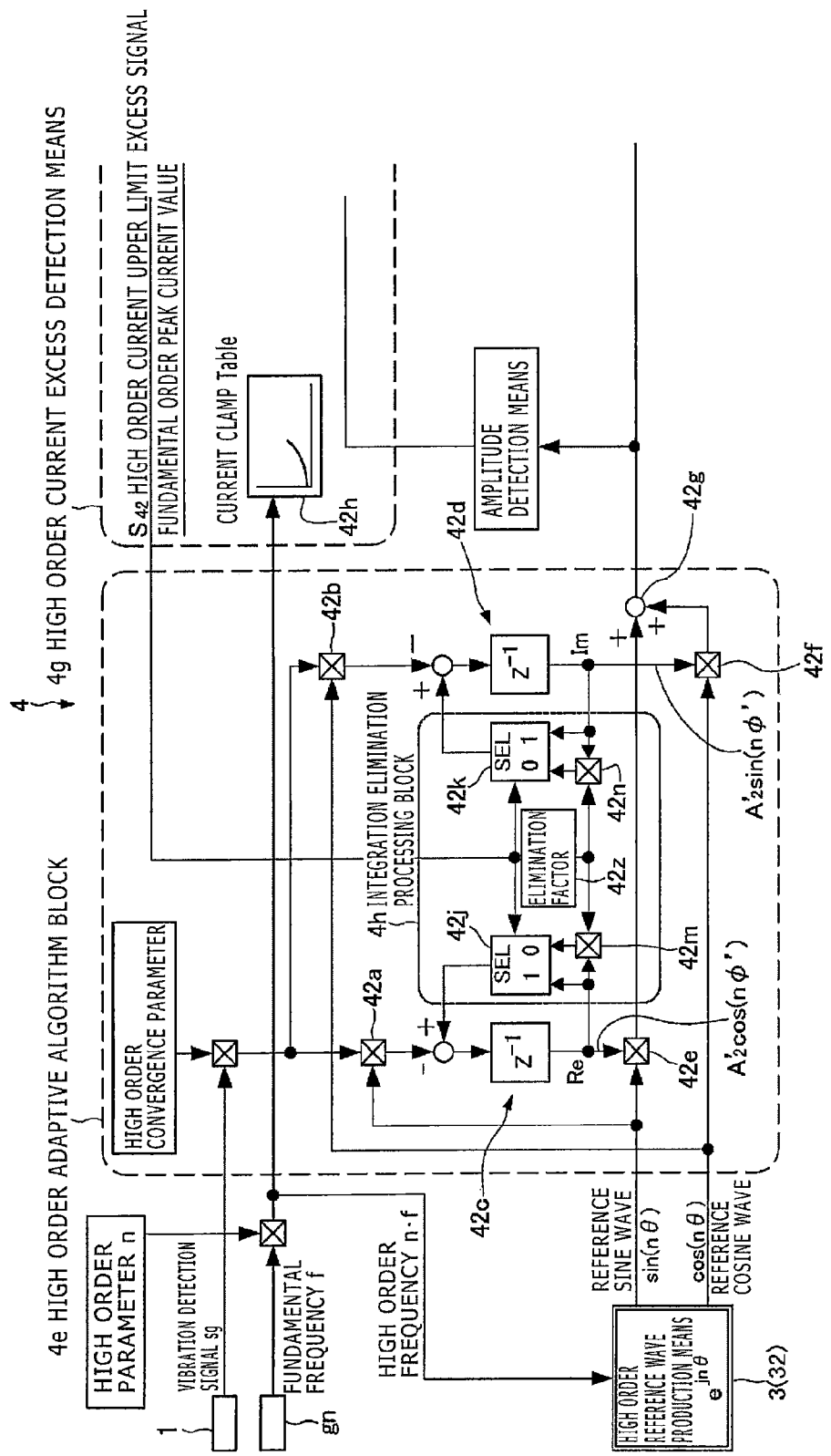
FIG. 5 is a block diagram showing a configuration relating to vibration damping control for high orders in the embodiment.

Therefore, also for the high orders, narrowing control similar to that described hereinabove is carried out. In particular, as seen in FIG. 5, the vibration damping apparatus further includes reference wave production means 3 (32) for producing a high order reference wave $e^{jn\theta}=(\sin n\theta, \cos n\theta)$ from the fundamental frequency f, a high order adaptive algorithm block 4e serving as high order adaptive controlling means for calculating high order adaptive filter factors $(Re, Im)_n=(A_2' \cos n\phi', A_2' \sin n\phi')$ from a vibration detection signal sg obtained from the vibration detection means 1 and the high order reference wave $e^{jn\theta}$, producing a high order vibration damping current instruction $I_{42}$ based on the high order adaptive filter factors $(Re, Im)_n$ and generating vibration of a phase opposite to that of vibration from the vibration generation source gn at the position pos at which vibration damping is to be carried out together with the fundamental order vibration damping current instruction $I_{41}$ through the excitation means 2, amplitude detection means 4f for calculating high order peak current $A_2'$ of the high order vibration damping current instruction $I_{42}$, and high order current excess detection means 4g for deriving a high order current upper limit value $\alpha_2$ determined in the clamp table 42h from the fundamental frequency f and producing, when the peak current $A_2'$ of the high order vibration damping current instruction $I_{42}$ exceeds a predetermined value hereinafter described, a high order current upper limit excess signal $S_{42}$ (ON signal) and inputting the high order current upper limit excess signal $S_{42}$ to the high order adaptive algorithm block 4e. If the high order peak current $A_2'$ of the high order vibration damping current instruction $I_{42}$ does not exceed the predetermined value, then no signal is outputted (OFF signal).

The function of the high order adaptive algorithm block 4e is substantially similar to the function of the fundamental adaptive algorithm block 4a, and multipliers 42a, 42b, 42e and 42f correspond to the multipliers 41a, 41b, 41e and 41f, respectively, and integrators 42c and 42d correspond to the integrators 41c and 41d, respectively, while an adder 42g corresponds to the adder 41g. Also the functions of the amplitude detection means 4f, the high order current excess detection means 4g and an integration elimination processing block 4h are basically similar to the functions of the amplitude detection means 4b, fundamental order current excess detection means 4c and integration elimination processing block 4d, respectively. Also, a current clamp table 42h corresponds to the current clamp table 41h, and also flag setting sections 42j and 42k, an elimination factor setting section 42z and multipliers 42m and 42n correspond to the flag setting sections 41j and 41k, elimination factor setting section 41z and multipliers 41m and 41n, respectively.

Further, while the high order current upper limit excess signal $S_{42}$ is inputted, the high order adaptive algorithm block 4e carries out control of correcting, every time the high order adaptive filter factors $(Re, Im)_n=(A_2' \cos n\phi', A_2' \sin n\phi')$ are calculated, the high order adaptive filter factors $(Re, Im)_n$ in a direction in which the high order vibration damping current instruction determined in advance is limited within a range determined in advance. Also, operation of the integration elimination processing block 4h little differs from that of the integration elimination processing block 4d for the fundamental order.

Figure 6:
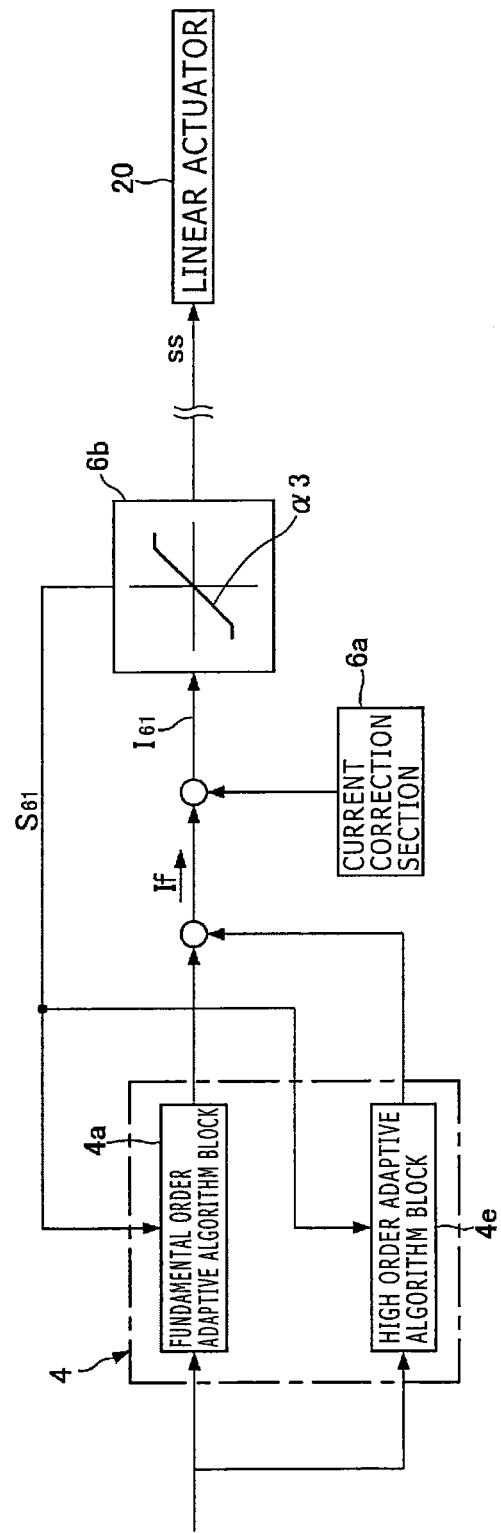
FIG. 6 is a block diagram showing a configuration relating to vibration damping control corresponding to a current correction section in the embodiment.

It is to be noted that the predetermined value which is a clamp value in the high orders is different from that in the case of the fundamental order in that it is not the high order current upper limit value $\alpha_2$ itself but is a value obtained by subtracting the fundamental order peak current value $A_1'$ from the high order current upper limit value $\alpha_2$. Also, where the fundamental order vibration damping current instruction $I_{41}$ and the high order vibration damping current instruction $I_{42}$ do not exceed the upper limit values $\alpha_1$ and $\alpha_2$, respectively, if the total vibration damping current instruction value (amplitude) If exceeds its upper limit value as a result of superposition as illustrated in FIG. 6, then collision of the movable element 23 with the stator 22 in the linear actuator 20 or breakage of the controller may possibly occur, and therefore, the fundamental order vibration damping current instruction $I_{41}$ is adopted preferentially. In other words, the high order vibration damping current instruction $I_{42}$ is supplied within a range within which there is a room even where the fundamental order vibration damping current instruction $I_{41}$ is supplied.

Further, as a case in which a current instruction is limited, there is a case in which such current correction section 6a serving as driving instruction signal correction means for applying such correction as illustrated in FIG. 6 to the current instruction $I_{41}+I_{42}$ exists. In such a case, post-correction current excess detection means 6b for producing and inputting a post-correction current excess signal $S_{61}$ to adaptive algorithm blocks 4a and 4e when the vibration damping current instruction value $I_{61}$ after correction exceeds a current upper limit value $\alpha_3$ set based on a predetermined reference in advance may be provided further. In this instance, the adaptive algorithm blocks 4a and 4e are configured such that input lines of the excess signals $S_{41}$ and $S_{42}$ and an input line of the post-correction current excess signal $S_{61}$ are connected to each other by OR circuits such that, even when the excess signals $S_{41}$ and $S_{42}$ are not inputted, the adaptive algorithm blocks 4a and 4e carry out, in response to that the post-correction current excess signal $S_{61}$ is inputted, control of correcting the adaptive filter factors (Re, Im) and (Re, Im)$_n$ in a direction in which the vibration damping current instructions $I_{41}$ and $I_{42}$ are limited within a range determined in advance every time the adaptive filter factors (Re, Im) and (Re, Im)$_n$ are calculated. If an excess is found by the post-correction current excess detection means 6b, then there is the possibility that an excessively high current instruction may rush as it is into the linear actuator 20 until the adaptive control comes to exhibit an actual effect. Therefore, only when an excess is found by the post-correction current excess detection means 6b, also a configuration which carries out current clamp (head cutting) similar to that in the prior art to protect the system from damage or the like is effective. In this manner, collision of the movable element 23 with the stator 22 or breakage of the controller arising from a variation of the current instruction value $I_{61}$ by correction cannot be coped with only by the adaptive controlling means 4 which produces a current instruction $I_{41}$ before correction. However, taking correction into account, it is decided whether or not the amplitude value of the current instruction value $I_{61}$ exceeds the upper limit, and a result of the decision is fed back upon calculation of the filter factors Re and Im.

Further, the technique of the limitation to narrowing of current is effective also for suppression of outputting of an excessively high correction value from the current correction section 6a.

Figure 7:
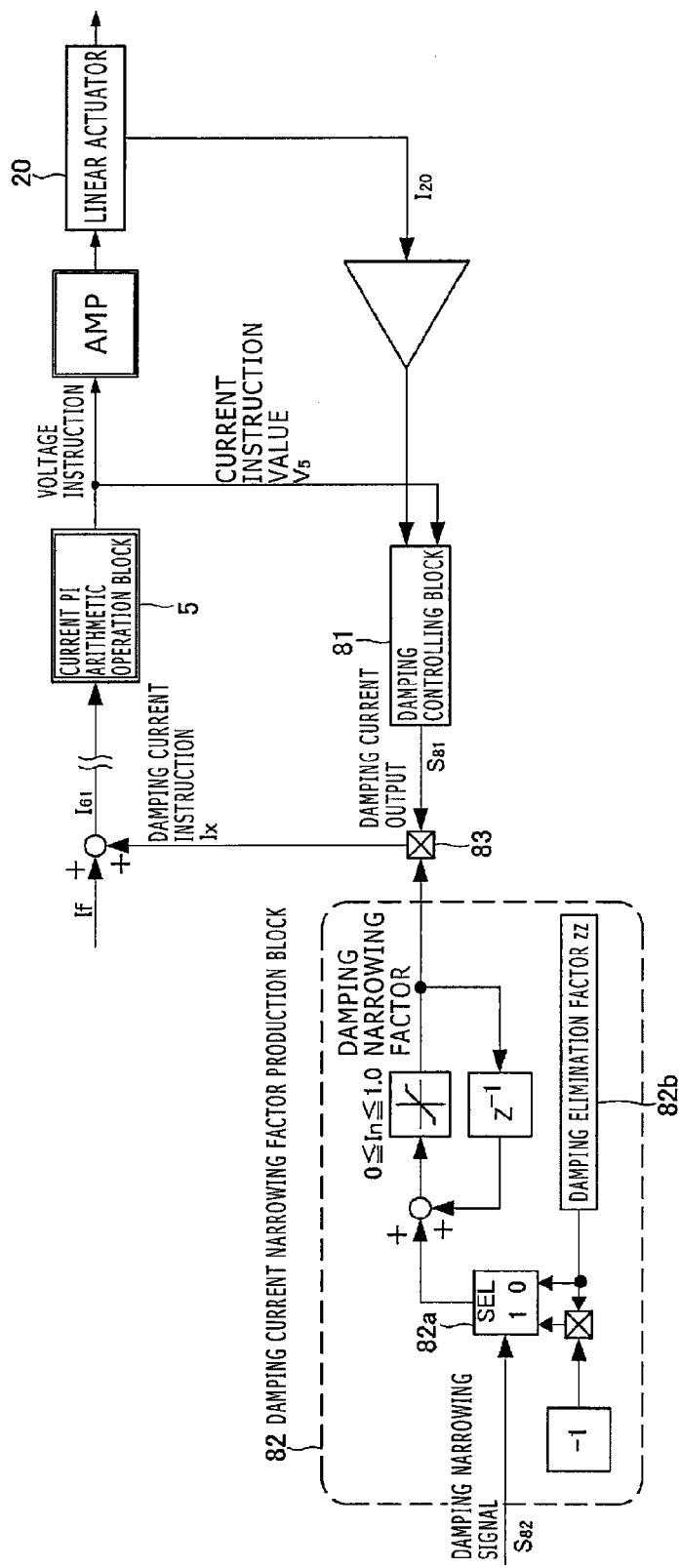
FIG. 7 is a block diagram showing a configuration relating to damping control which is an example of a current correction section in the embodiment.

For example, in order to moderate resonance of the linear actuator 20 of FIG. 4(b) which is a reciprocating motor, a damping controlling block 81 is sometimes configured such that it produces a damping current output signal $S_{81}$ as an attenuation current instruction from a motor inductive voltage as seen in FIG. 7. The idea itself of such damping control as just described is already disclosed partly in Patent Document 1. The motor inductive voltage can be determined from a feedback current detection value $I_{20}$ of the linear actuator 20 which is a motor and a voltage instruction value V5 of the current PI arithmetic operation block 5, and the damping controlling means 81 outputs a damping current output signal $S_{81}$ of a value corresponding to the motor inductive voltage.

However, if the damping current output signal $S_{81}$ directly enters the vibration damping current instruction value $I_{61}$ illustrated in FIG. 6, then this may possibly make an instability factor of the control system.

Therefore, in order to suppress this damping current output signal $S_{81}$, a damping current narrowing factor production block 82 shown in FIG. 7 is added. This damping current narrowing factor production block 82 includes a flag setting section 82a which sets a flag of 1 or 0 depending upon whether or not a damping narrowing signal $S_{82}$ is inputted. When the signal $S_{82}$ is inputted (when the flag is 1), the damping current narrowing factor production block 82 subtracts a damping elimination factor zz set in advance in an elimination factor setting section 82b which is a subtraction factor setting section from the preceding cycle value $Z^{-1}$ for every arithmetic operation timing. However, when the signal $S_{82}$ is not inputted (when the flag is 0), a damping elimination factor z set in the damping elimination factor setting section 82b is added to the preceding cycle value $Z^{-1}$ for every arithmetic operation timing. By such subtraction or addition, a damping narrowing factor In is varied within a range, for example, from 0 to 1. Then, the value of the damping current output signal $S_{81}$ from the damping controlling block 81 is multiplied by the damping narrowing factor In by a multiplication value 83, and a resulting value is used as the damping current instruction Ix. The damping narrowing signal $S_{82}$ is inputted when the post-correction current excess signal $S_{61}$ described hereinabove is generated, when a voltage instruction upper limit detection signal $S_{71}$ hereinafter described is generated or in a like case.

In particular, if the damping narrowing signal $S_{82}$ is applied (ON) from the outside, then the narrowing factor In is decreased by an amount corresponding to the damping elimination factor zz for each arithmetic operation cycle, and the narrowing factor In becomes 0.0 in the minimum. If the damping narrowing signal $S_{82}$ is turned OFF, then the narrowing factor In increases by an amount corresponding to the damping elimination factor zz for each arithmetic operation cycle, and the narrowing factor becomes 1.0 in the maximum. Since the damping current instruction Ix is gradually varied, it is possible to efficiently moderate resonance of the linear actuator 20 which is a motor while avoiding that the control system becomes unstable by a sudden variation of the value of the damping current instruction Ix within the current instruction value $I_{61}$. Such a narrowing factor production block 82 as just described is an example to the end, and if the block increases or decreases the narrowing factor In from the damping narrowing signal $S_{82}$, then it may have any internal configuration.

Figure 8:
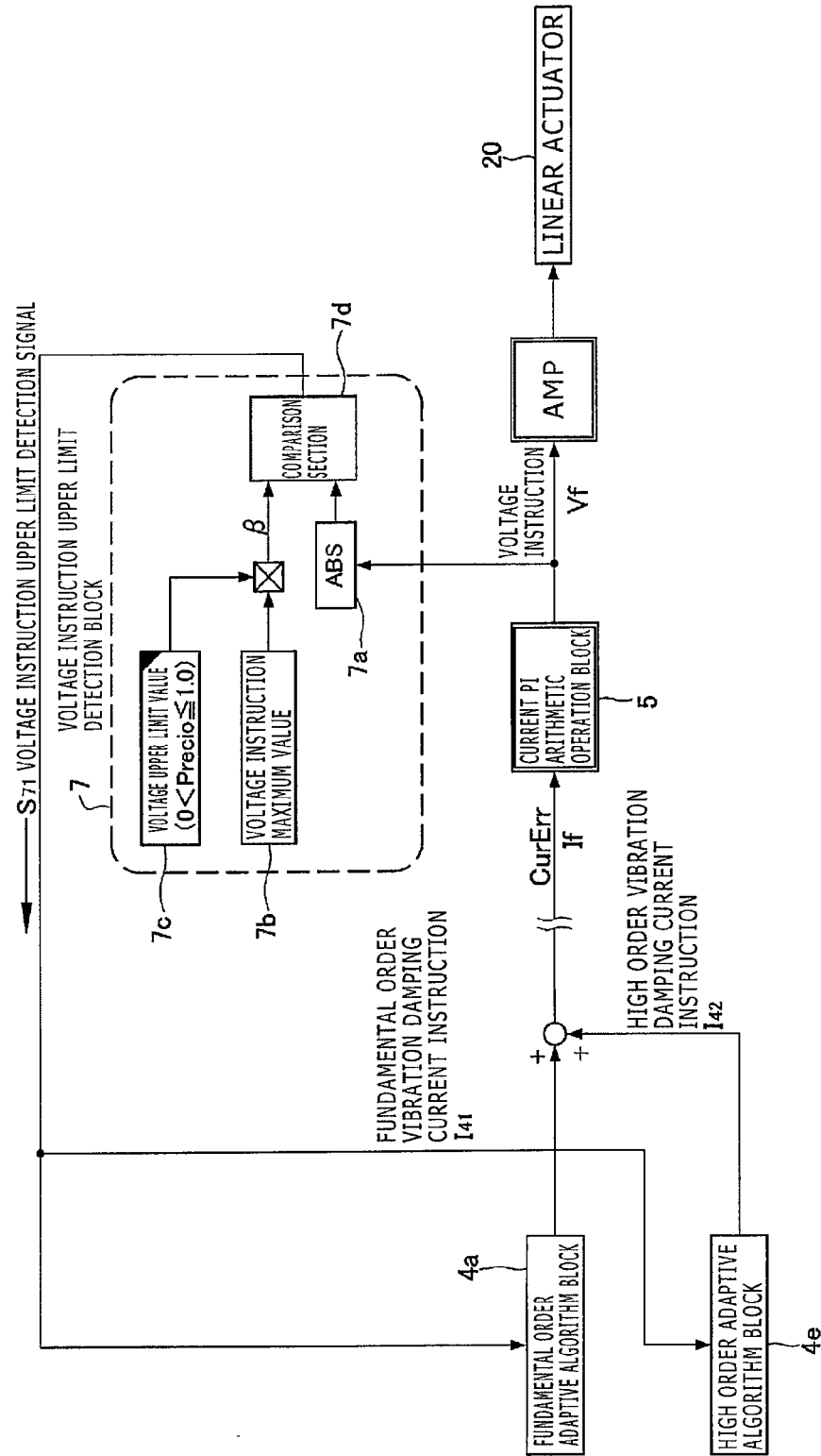
FIG. 8 is a block diagram showing a configuration relating to vibration damping control ready for an abnormal voltage in the embodiment.

In addition to the current clamp described above, in the control apparatus of the type described, if the fundamental frequency f becomes high or a high impact is applied from the outside and an enormous inductive voltage is excited in the linear actuator 20 shown in FIG. 8, then an application voltage instruction Vf becomes high, and in the worst case, a voltage saturated state (in which further voltage application cannot be carried out and a current control failure occurs) appears. In order to prevent this, in the present embodiment, the voltage instruction value Vf outputted from the current PI arithmetic operation block 5 is normally supervised to further narrow the current instruction immediately before voltage saturation occurs.

In particular, a voltage instruction upper limit detection block 7 serving as voltage instruction detection means which detects the voltage instruction value Vf appearing on the input line of the vibration damping current instruction If to the linear actuator 20 and outputs a voltage instruction upper limit detection signal $S_{71}$ is added.

Since the voltage instruction value Vf is a positive or negative value, in the voltage instruction upper limit detection block 7, an absolute value process is carried out by an ABS processing section 7a so that all values become positive values. In order to lighten arithmetic operation here, a comparison section at a succeeding stage may carry out upper limit detection with positive and negative values without carrying out the absolute value process.

Since the maximum value of the voltage instruction permitted to the linear actuator 20 is known in advance, the value is stored into a maximum value storage section 7b, and a voltage upper limit ratio value is set by a voltage upper limit ratio setting section 7c and a value obtained by multiplying the voltage instruction maximum value extracted from the maximum value storage section 7b by the voltage upper limit ratio value is determined as a voltage upper limit threshold value β. The voltage upper limit ratio value may be a fixed value or may be varied in accordance with some other parameter such as a frequency. Or, a hysteresis characteristic may be applied. Then, the calculated voltage upper limit threshold value β and the voltage instruction value |Vf| obtained by the absolute value process are compared with each other by a comparison section 7d. Then, if the voltage instruction value |Vf| exceeds the upper limit, then the comparison section 7d outputs the voltage instruction upper limit detection signal $S_{71}$ (ON). This voltage instruction upper limit detection signal $S_{71}$ is inputted to the fundamental adaptive algorithm block 4a and the high order adaptive algorithm block 4e together with excess signals $S_{41}$ and $S_{42}$ or the post-correction current excess signal $S_{61}$ through the OR circuits. Every time the adaptive filter factors (Re, Im) and (Re, Im)$_n$ are calculated, the adaptive filter factors (Re, Im) and (Re, Im)$_n$ are revised in a direction in which the vibration damping current instruction If is narrowed down in a similar manner as in the foregoing description. Consequently, not only when the vibration damping current instruction If exceeds but also in the case where the voltage instruction value Vf inputted to the linear actuator 20 exceeds, the vibration damping current instruction If is limited.

If the present embodiment described above is studied from a point of view of the first aspect of the present disclosure, then the vibration damping apparatus of the present embodiment includes reference wave production means 3 (31) for producing a reference wave $e^{j\theta}$ from a fundamental frequency f, a fundamental order adaptive algorithm block 4a for calculating fundamental order adaptive filter factors (Re, Im) from a vibration detection signal sg detected from a position at which vibration is to be damped and the reference wave $e^{j\theta}$, producing a fundamental order vibration damping current instruction $I_{41}$ based on the fundamental order adaptive filter factors (Re, Im) and causing vibration of a phase opposite to the phase of vibration from the engine gn which is a vibration generating source to be generated at the position at which vibration is to be damped, amplitude detection means 4b for calculating a peak current value $A_1'$ of the fundamental order vibration damping current instruction $I_{41}$, and fundamental order current excess detection means 4c for deriving a fundamental order current upper limit value $α_1$ determined in advance from the fundamental frequency and producing and inputting a fundamental order current upper limit excess signal $S_{41}$ to the fundamental order adaptive algorithm block 4a when the peak current value $A_1'$ of the fundamental order vibration damping current instruction $I_{41}$ exceeds the fundamental order current upper limit value $α_1$, and the fundamental order adaptive algorithm block 4a modifies, while the fundamental order current upper limit excess signal $I_{41}$ is inputted, the fundamental order adaptive filter factors (Re, Im) in a direction in which the vibration damping current instruction $I_{41}$ is limited within a range determined in advance.

Where the vibration damping apparatus is configured in this manner, when the vibration damping current instruction $I_{41}$ exceeds, not an excess amount of the vibration damping current instruction $I_{41}$ is cut, but revision of limiting the vibration damping current instruction $I_{41}$ within the range determined in advance is repeated. Therefore, while generation of harmonics is avoided, collision of the movable element 23 with the stator 22, breakage of the controller and so forth can be prevented effectively, and the reliability and the durability of the present vibration damping apparatus can be enhanced effectively.

Further, this vibration damping apparatus further includes high order reference wave production means 3 (32) for producing a high order reference wave $e^{jn\theta}$ from the fundamental frequency f, a high order adaptive algorithm block 4e for calculating high order adaptive filter factors (Re, Im)$_n$ from a vibration detection signal sg obtained from the vibration detection means 1 and the high order reference wave $e^{jn\theta}$ to produce a high order vibration damping current instruction $I_{42}$ based on the high order adaptive filter factors (Re, Im)$_n$ to generate vibration having an opposite phase to that of the vibration from the vibration generation source 1 together with the fundamental order vibration damping current instruction $I_{41}$ at the position at which vibration damping is to be carried out through the excitation means 2, amplitude detection means 4f for calculating a high order peak current value of the high order vibration damping current instruction $I_{42}$, and high order current excess detection means 4g for deriving a high order current upper limit value $α_2$ determined in advance from the fundamental frequency f to produce, where a peak current value $A_2'$ of the high order vibration damping current instruction $I_{42}$ exceeds a value obtained by subtracting the fundamental order peak current value $A_1'$ from the high order current upper limit value $α_2$, a high order current upper limit excess signal $S_{42}$ and inputting the produced signal to the high order adaptive algorithm block 4e, and the high order adaptive algorithm block 4e revises, within a period within which the high order current upper limit excess signal is inputted thereto, the high order adaptive filter factors (Re, Im)$_n$ in a direction in which the high order vibration damping current instruction $I_{42}$ is limited within a range determined in advance every time the high order adaptive filter factors (Re, Im)$_n$ are calculated.

Where the vibration damping apparatus is configured in this manner, similarly as in the case of the fundamental order described above, when the high order vibration damping current instruction $I_{42}$ exceeds, not an excess amount of the high order vibration damping current instruction $I_{42}$ is cut, but revision of limiting the high order vibration damping current instruction $I_{42}$ to a value within the range determined in advance is repeated. Therefore, while generation of harmonics is avoided, collision of the movable element 23 with the stator 22, breakage of the controller and so forth can be prevented effectively. However, also when any of the fundamental order vibration damping current instruction $I_{41}$ and the high order vibration damping current instruction $I_{42}$ does not exceed the corresponding upper limit value, if the vibration damping current instruction value (amplitude) $I_{41}+I_{42}$ exceeds the upper limit value as a result of the superposition, then collision of the movable element 23 with the stator 22 or breakage of the controller occurs. However, in the present embodiment, a value obtained by subtracting the fundamental order current peak value $A_1'$ from the upper limit value $\alpha_2$ to the high order vibration damping current instruction $I_{42}$ is used as a threshold value for the decision of the excess, and the current instruction is preferentially distributed to the fundamental order rather than the high orders and a surplus amount is outputted as the high order vibration damping current instruction $I_{42}$. Therefore, such a situation that, when the superposition is carried out, the amplitude value becomes excessively high and gives rise to production of excessively high current, which results in breakage of the reliability and the durability of control, can be avoided effectively.

Further, a system which includes a current correction section 6a adapted to further apply correction to the vibration damping current instructions $I_{41}$ and $I_{42}$ produced by the adaptive algorithm blocks 4a and 4e further includes post-correction current excess detection means 6b for producing, where the current instruction value $I_{61}$ after the correction exceeds a current upper limit value $\alpha_3$ set in advance, a post-correction current excess signal $S_{61}$ and inputting the produced signal to the adaptive algorithm blocks 4a and 4e, and wherein the adaptive algorithm blocks 4a and 4e correct, also where the post-correction current excess signal $S_{61}$ is inputted thereto, the adaptive filter factors (Re, Im) and (Re, Im)$_n$ in a direction in which the vibration damping current instruction is limited to a value within a range determined in advance every time the adaptive filter factors (Re, Im) and (Re, Im)$_n$ are calculated such that presence or absence of an excess of the current upper limit value is decided taking the correction into account. Therefore, also collision of the movable element 23 with the stator 22 or breakage of the controller arising from a variation of the vibration damping current instruction value $I_{61}$ by the correction can be avoided effectively.

Furthermore, the vibration damping apparatus further includes voltage instruction upper limit detection means 7 for detecting a voltage instruction value Vf appearing on an input line of a vibration damping current instruction If to the excitation means 2 and inputting, where the voltage instruction value Vf exceeds an upper limit threshold value $\beta$ of a voltage instruction set in advance and allowed to the excitation means 2, a voltage instruction upper limit detection signal $S_{71}$ to the adaptive algorithm blocks 4a and 4e, and the adaptive algorithm blocks 4a and 4e correct, also where the voltage instruction upper limit detection signal $S_{71}$ is inputted thereto, the adaptive filter factors (Re, Im) and (Re, Im)$_n$ in a direction in which the vibration damping current instruction If is narrowed within a range determined in advance every time the adaptive filter factors (Re, Im) and (Re, Im)$_n$ are calculated.

In this manner, not only when the current instruction value If exceeds, but also when the voltage instruction value Vf inputted to the excitation means 2 exceeds, the vibration damping current instruction If is limited. Therefore, occurrence of voltage saturation when enormous external force is applied to the linear actuator 20 or in a high frequency region can be prevented, and the reliability or the durability of the system can be enhanced further effectively.

Then, the adaptive algorithm blocks 4a and 4e are structured such that they repetitively carry out a process for updating the adaptive filter factors (Re, Im) and (Re, Im)$_n$ while integrating the input signal sg inputted thereto from the vibration detection section 1 and carry out a process for narrowing the integration values to low values when the vibration damping current instruction If is limited. Therefore, an effective clamp characteristic can be applied effectively depending upon the setting of the narrowing factor k.

Accordingly, by incorporating such a vibration damping apparatus as just described into a vehicle, the reliability or the durability relating to a vibration damping function of the vehicle can be enhanced effectively, and a superior traveling function can be implemented.

While the embodiment of the first aspect of the disclosure is described above, particular configurations of the components are not limited only to those of the embodiment described above.

For example, while, in the embodiment described above, the fundamental order adaptive filter factors (Re, Im) are revised within a range determined in advance every time the fundamental order adaptive filter factors (Re, Im) are calculated, the first aspect of the disclosure includes a mode wherein modification is applied based on a plurality of calculated values, another mode in which modification is applied divisionally by a plural number of times based on one calculated value, and so forth.

Further, if attenuation or transmission delay occurs along a path from the excitation means having the linear actuator to the position at which vibration damping is required, then the vibration damping apparatus can be configured such that an adaptive filter factor is calculated taking the attenuation or the transmission delay into consideration and is outputted as a vibration damping current instruction having an appropriate amplitude or phase.

Further, the embodiment described above can be modified in various forms without departing from the subject matter of the present disclosure such as to apply the first aspect of the present disclosure described above to mobile apparatus or information apparatus other than the vehicle with which generation of vibration is a problem.

On the other hand, if the present embodiment described above is studied from a point of view of the second aspect of the present disclosure, the electric actuator of the present embodiment produces, when a current instruction $I_{41}$ which is a periodical signal is to be produced and inputted to a linear actuator 20 to drive the linear actuator 20, the current instruction $I_{41}$ based on an instruction vector (vectors Vel$_A$ and Vel$_B$) having amplitude information and phase information corresponding to an amplitude and a phase of the current instruction $I_f$, and includes factor calculation means 44 for calculating factors (Re, Im) individually indicating sizes of respective vectors (vectors Ve2$_A$, Ve3$_A$, and the like) which represent the instruction vector (vectors Vel$_A$, and the like), where the instruction vector (vectors Vel$_A$ and Vel$_B$) are represented by the plurality of vectors (vectors Ve2$_A$, Ve3$_A$, Ve2$_B$ and Ve3$_B$) and cross with each other, instruction signal production means 45 for producing the current instruction $I_{41}$ based on the factors (Re, Im) calculated by the factor calculation means 44, and narrowing instruction means (current excess detection means 4c) for producing, where a predetermined condition is satisfied, a fundamental order current upper limit excess signal $S_{41}$ which is a narrowing instruction and inputting the produced signal to the factor calculation means 44, and the factor calculation means 44 corrects, within a period within which the fundamental order current upper limit excess signal $S_{41}$ is inputted thereto, all of the factors (Re, Im) in a direction in which the current instruction $I_{41}$ is limited and a ratio of correction for the factors (Re, Im) is equal among all factors. Therefore, the magnitude of the instruction vectors vectors Vel$_A$ and so forth is revised in the direction in which the current instruction $I_{41}$ is limited while the direction of the instruction vector (vectors Vel$_A$ and so forth) does not vary. Consequently, collision of the movable element 23 with the stator 22, breakage of the controller and so forth can be prevented effectively while preventing the phase of the periodic current instruction $I_{41}$ produced based on the factors (Re, Im) from displacing. Consequently, not only the reliability and the durability of the linear actuator 20 but also the driving accuracy can be improved effectively.

In a system which includes a current correction section 6a for further applying correction to the current instruction $I_{41}$ produced by the instruction signal production means 45, collision of the movable element 23 with the stator 22 or breakage of the controller arising from a variation of the current instruction value $I_{61}$ by the correction cannot be coped with only by the adaptive controlling means 4 which produces the current instruction $I_{41}$ before the correction. However, in the present embodiment, the narrowing instruction means is the post-correction current excess detection means 6b, and the post-correction current excess detection means 6b decides that, when the amplitude value of the current instruction value $I_{61}$ after the correction exceeds an upper limit set in advance, the predetermined condition is satisfied, and inputs the post-correction current excess signal $S_{61}$ to the coefficient calculation means 44. Therefore, it is decided whether or not the amplitude value of the current instruction value $I_{61}$ exceeds the upper limit value taking the correction into account. Consequently, a failure arising from a variation of the current instruction value $I_{61}$ by the correction of the current correction section 6a can be avoided effectively without giving rise to phase displacement of the current instruction value $I_{61}$.

Furthermore, the factor calculation means 44 repetitively carries out the calculation of the adaptive filter factors (Re, Im) while keeping the revision of the adaptive filter factors (Re, Im) for one time revision within a range determined in advance so that the revision of the adaptive filter factors (Re, Im) is carried out stepwise. Therefore, when the current upper limit excess signal $S_{41}$ or the post-correction current excess signal $S_{61}$ which are narrowing instruction signals is inputted, not the current instruction $I_{41}$ is cut immediately, but the revision of limiting the current instruction $I_{41}$ within the range determined in advance is repeated. Therefore, while generation of harmonics is avoided, collision of the movable element 23 with the stator 22, breakage of the controller and so forth can be prevented effectively, and not only the reliability and the durability of the apparatus but also the controlling accuracy of the electric actuator can be improved.

Further, for a control apparatus, there is a severe request that, when vibration having a phase opposite to that of vibration to be damped is excited, the phase of vibration to be excited must fully coincide with an object phase, and phase displacement of the current instruction $I_{41}$ has a significant bad influence on the vibration damping accuracy. However, if the vibration damping apparatus is configured such that the electric actuator driving apparatus of the present embodiment is incorporated and vibration having a phase opposite to that of vibration to be damped is generated through the electric actuator which is driven by the driving apparatus to carry out vibration damping, then the vibration damping accuracy can be improved significantly.

While the embodiment of the second aspect of the embodiment is described above, particular configurations of the components are not limited only to those of the embodiment described above.

For example, the narrowing instruction means may be configured such that, when the magnitude of an instruction vector represented by factors exceeds a predetermined upper limit value, it determines that the predetermined condition described hereinabove is satisfied and inputs a narrowing instruction signal to the factor calculation means. In particular, as shown in FIG. 11, a decision section 146 is provided as the narrowing instruction means, and adaptive filter factors (Re, Im) are inputted to the decision section 146. The decision section 146 calculates the magnitude of an instruction vector (such as the vector $Vel_A$) based in the inputted adaptive filter factors (Re, Im) and decides whether or not a result of the calculation is equal to or higher than a predetermined upper limit value. If the result of the calculation is equal to or higher than the predetermined upper limit value, then a current upper limit excess signal $S_{41}$ is produced and inputted to the factor calculation means 44. However, if the result of the calculation is not equal to or higher than the predetermined upper limit value, then the current upper limit excess signal $S_{41}$ is not inputted to the factor calculation means 44. If the configuration just described is used, then since the magnitude of the instruction vector corresponds to an amplitude value of the driving instruction signal and since the coefficients are scalar, the magnitude of the instruction vector can be determined by four arithmetic operations which are easy and simple. Thus, in comparison with an alternative case in which a driving instruction signal which is a periodical signal is used, an amplitude value of a driving instruction signal can be determined by simple and easy arithmetic operation, and the responsiveness can be improved.

Further, while, in the present embodiment, the driving instruction signal is a current signal, it may otherwise be a voltage signal. Further, while, in the present embodiment, the factor is an adaptive filter factor, the factor is not limited particularly to this. Further, when the narrowing instruction means carries out a decision, it may use an amplitude value of a final current waveform or a final voltage waveform appearing on the input line of the driving instruction signal to the electric actuator to carry out the decision. Or, an amplitude value of the final current waveform or the final voltage waveform after extraction of a predetermined frequency component may be used to carry out the decision described above.

In addition, while, in the present embodiment, the current correction section 6a is applied as the driving instruction correction means, means for correcting a voltage may be used instead. Further, while, in the present embodiment, the narrowing instruction means refers to the amplitude value of the driving instruction signal after the correction to which correction is applied actively by the current correction section 6a or the like, the value to which the narrowing instruction means refers is not limited to this if a corrected driving instruction signal is used. For example, if the fundamental frequency f becomes high or a high impact is applied from the outside or else an enormous voltage is excited in the linear actuator 20, then the application voltage instruction which appears on the input line of the driving instruction signal to the linear actuator 20 becomes high. In the worst case, a voltage saturation state (in which voltage application cannot be applied and a current control failure is invited) occurs. In order to prevent this, the narrowing instruction means may be configured such that it produces a narrowing instruction signal by deciding whether or not the voltage value of the driving instruction signal appearing on the input line of the driving instruction signal to the linear actuator 20 is equal to or higher than a predetermined upper limit.

Further, in the present embodiment, in order to prevent generation of harmonics, the factor calculation means 44 is configured such that, while the fundamental order current upper limit excess signal $S_{41}$ which is a narrowing instruction signal is inputted, every time factors (Re, Im) are calculated, all coefficients (Re and Im) are revised in a direction in which the current instruction $I_{41}$ is limited within a range determined in advance thereby to limit the coefficients (Re, Im) stepwise. However, in an application with which generation of harmonics does not matter, the coefficients (Re, Im) need not be revised stepwise.

Further, in the present embodiment, the current excess detection means 4c which serves as the narrowing instruction means is configured such that, when a predetermined condition is satisfied, it normally outputs the fundamental order current upper limit excess signal $S_{41}$ which is a narrowing instruction signal to the factor calculation means 44. However, if the factor calculation means can decide upon calculation of coefficients whether or not a narrowing instruction signal is inputted, then the current excess detection means 4c is not limited to that to which a narrowing instruction signal is always inputted.

Further, the present embodiment can be revised in various forms without departing from the subject matter of the present disclosure such as to apply the second aspect of the present disclosure to apparatus or instruments which require driving of an electric actuator in addition of a vibration damping apparatus.

The invention claimed is:

1. A vibration damping apparatus, comprising:
   a reference wave production section that produces a reference wave from a fundamental frequency;
   a control circuit including
      a fundamental adaptive algorithm block that calculates fundamental order adaptive filter factors from a vibration detection signal output from a vibration detection section and the reference wave, and that produces a fundamental order vibration damping current instruction based on the fundamental order adaptive filter factors to cause vibration having an opposite phase to vibration detected by the vibration detection section;
      an amplitude detector that calculates a peak current value of the fundamental order vibration damping current instruction; and
      a fundamental order current excess detection unit that derives a fundamental order current upper limit value determined in advance from the fundamental frequency and produces, when a peak current value of the fundamental order vibration damping current instruction exceeds the fundamental order current upper limit value, a fundamental order current upper limit excess signal and outputs the produced signal to said fundamental adaptive algorithm block, wherein
   said fundamental adaptive algorithm block, revises, within a period within which the fundamental order current upper limit excess signal is received, the fundamental order adaptive filter factors in a direction in which the vibration damping current instruction is limited within a range determined in advance.

2. The vibration damping apparatus according to claim 1, further comprising:
   a high order reference wave production section that produces a high order reference wave from the fundamental frequency, wherein
   the control circuit further includes
      a high order adaptive algorithm block that calculates high order adaptive filter factors from the vibration detection signal output from the vibration detection section and the high order reference wave to produce a high order vibration damping current instruction based on the high order adaptive filter factors to generate vibration having an opposite phase to vibration detected by the vibration detection section together with the fundamental order vibration damping current instruction;
      the amplitude detection section that calculates a high order peak current value of the high order vibration damping current instruction; and
      a high order current excess detection unit that derives a high order current upper limit value determined in advance from the fundamental frequency and produces, when a peak current value of the high order vibration damping current instruction exceeds a value obtained by subtracting the fundamental order peak current value from the high order current upper limit value, a high order current upper limit excess signal and outputs the produced signal to said high order adaptive algorithm block, wherein
   said high order adaptive algorithm block revises, within a period within which the high order current upper limit excess signal is received, the high order adaptive filter factors in a direction in which the high order vibration damping current instruction is limited within a range determined in advance every time the high order adaptive filter factors are calculated.

3. The vibration damping apparatus according to claim 1, further comprising:
   a current correction section that applies correction to the vibration damping current instruction produced by said fundamental adaptive algorithm block; and
   a post-correction current excess detection section that produces, when the current instruction value after the correction exceeds a current upper limit value set in advance, a post-correction current excess signal and outputs the produced signal to said fundamental adaptive algorithm block, wherein
   said fundamental adaptive algorithm block revises, when the post-correction current excess signal is received, the adaptive filter factor in a direction in which the vibration damping current instruction is limited within a range determined in advance every time the adaptive filter factors are calculated.

4. The vibration damping apparatus according to claim 1, further comprising:
   a voltage instruction upper limit detection block that detects a voltage instruction value appearing on an input line of a vibration damping current instruction and outputs, when the voltage instruction value exceeds an upper limit threshold value of a voltage instruction set in advance, a voltage instruction upper limit detection signal to said fundamental adaptive algorithm block, wherein
   said fundamental adaptive algorithm block revises, when the voltage instruction upper limit detection signal is received, the adaptive filter factors in a direction in which the vibration damping current instruction is narrowed within a range determined in advance every time the adaptive filter factors are calculated.

5. The vibration damping apparatus according to claim 1, wherein said fundamental adaptive algorithm block repetitively carries out a process for updating the adaptive filter factors while integrating the input signal inputted thereto from said vibration detection section and carries out a process for narrowing the integration values to low values when the vibration damping current instruction is limited.

6. A vehicle comprising the vibration damping apparatus according to claim 1.

7. An electric actuator driving apparatus which produces, when a driving instruction signal which is a periodical signal is to be produced and output to an electric actuator to drive the electric actuator, the driving instruction signal based on an instruction vector having amplitude information and phase information corresponding to an amplitude and a phase of the driving instruction signal, the electric actuator driving apparatus comprising:

a control circuit including
a factor calculation section that calculates a plurality of factors individually indicating sizes of a plurality of vectors which represent the instruction vector and cross with each other;
an instruction signal production section that produces the driving instruction signal based on the factors calculated by said factor calculation section; and
a narrowing instruction section that produces, when a predetermined condition is satisfied, a narrowing instruction signal and outputs the produced signal to said factor calculation section, wherein
said factor calculation section revises, within a period within which the narrowing instruction signal is inputted, all of the factors in a direction in which the driving instruction signal is limited and a ratio of revision for the factors is equal among all factors.

8. The electric actuator driving apparatus according to claim 7, further comprising:
a current correction section that applies correction to the driving instruction signal produced by said instruction signal production section, wherein
said narrowing instruction section decides, when an amplitude value of the driving instruction signal after the correction exceeds a predetermined upper limit value, that the predetermined condition is satisfied.

9. The electric actuator driving apparatus according to claim 7, wherein said narrowing instruction section decides, when a magnitude of the instruction vector represented by the factors exceeds an upper limit value, that the predetermined condition is satisfied.

10. The electric actuator driving apparatus according to any of claim 7, wherein said factor calculation section repetitively carries out the calculation of the factors while keeping the revision of the factors for one time revision within a predetermined range so that the revision of the factors is carried out stepwise.

11. A vibration damping apparatus, comprising:
the electric actuator driving apparatus according to claim 7, the vibration damping apparatus generating vibration having a phase opposite to that of vibration to be damped through an electric actuator driven by said driving apparatus to carry out vibration damping.

12. A vibration damping method performed by a vibration damping apparatus, the vibration damping method comprising:
producing a reference wave from a fundamental frequency;
calculating fundamental order adaptive filter factors from a vibration detection signal output from a vibration detection section and the reference wave;
producing a fundamental order vibration damping current instruction based on the fundamental order adaptive filter factors to cause vibration having an opposite phase to that of vibration detected by the vibration detection section;
calculating a peak current value of the fundamental order vibration damping current instruction;
deriving a fundamental order current upper limit value determined in advance from the fundamental frequency to produce, when a peak current value of the fundamental order vibration damping current instruction exceeds the fundamental order current upper limit value, a fundamental order current upper limit excess signal; and
revising the fundamental order adaptive filter factors in a direction in which the vibration damping current instruction is limited within a range determined in advance.

13. A vibration damping apparatus, comprising:
a circuit that produces a reference wave from a fundamental frequency; and
a processor configured to:
calculate fundamental order adaptive filter factors from a vibration detection signal output from a vibration detector and the reference wave;
produce a fundamental order vibration damping current instruction based on the fundamental order adaptive filter factors to cause vibration having an opposite phase to that of vibration detected by the vibration detector;
calculate a peak current value of the fundamental order vibration damping current instruction;
derive a fundamental order current upper limit value determined in advance from the fundamental frequency to produce, when a peak current value of the fundamental order vibration damping current instruction exceeds the fundamental order current upper limit value, a fundamental order current upper limit excess signal; and
revise the fundamental order adaptive filter factors in a direction in which the vibration damping current instruction is limited within a range determined in advance.

* * * * *